(12) United States Patent
Akavaram et al.

(10) Patent No.: US 10,007,735 B2
(45) Date of Patent: Jun. 26, 2018

(54) TAILORED INTERPERSONAL COMMUNICATION PLATFORM (ICP) MANAGEMENT

(71) Applicant: INTERNATIONAL BUSINESS MACHINES CORPORATION, Armonk, NY (US)

(72) Inventors: Vikrant Akavaram, Foster City, CA (US); Lisa M Bradley, Cary, NC (US); Lillian Y Lei, Moss Beach, CA (US); Lawrence Louie, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 181 days.

(21) Appl. No.: 14/189,761

(22) Filed: Feb. 25, 2014

(65) Prior Publication Data

US 2015/0244668 A1   Aug. 27, 2015

(51) Int. Cl.
*H04L 12/58* (2006.01)
*G06F 17/30* (2006.01)
*H04L 29/06* (2006.01)
*G06Q 10/10* (2012.01)

(52) U.S. Cl.
CPC ........ *G06F 17/30876* (2013.01); *H04L 51/32* (2013.01); *H04L 51/36* (2013.01); *H04L 65/403* (2013.01); *G06Q 10/10* (2013.01)

(58) Field of Classification Search
CPC ............................... H04L 51/36; G06Q 10/10
USPC .................... 709/204, 206, 223, 205, 227
See application file for complete search history.

(56) References Cited

U.S. PATENT DOCUMENTS

| | | | |
|---|---|---|---|
| 7,958,193 B2 | 6/2011 | Augustiune | |
| 9,098,819 B1* | 8/2015 | Korula | G06Q 10/0635 |
| 9,338,106 B2* | 5/2016 | Radhakrishnan | H04L 41/22 |
| 9,679,112 B2* | 6/2017 | Brust | G06F 19/345 |
| 2005/0198125 A1* | 9/2005 | Macleod Beck | G06Q 10/107 709/204 |
| 2006/0031510 A1* | 2/2006 | Beck | H04L 51/12 709/226 |
| 2007/0168501 A1* | 7/2007 | Cobb | G06Q 30/02 709/224 |
| 2008/0294768 A1 | 11/2008 | Sampson et al. | |
| 2009/0028183 A1* | 1/2009 | Landers | G06Q 10/10 370/466 |

(Continued)

OTHER PUBLICATIONS

Toutain F, Bouabdallah A, Zemek R, Daloz C. Interpersonal context-aware communication services. Communications Magazine, IEEE. Jan. 2011;49(1):68-74.*

(Continued)

*Primary Examiner* — Ranodhi Serrao
*Assistant Examiner* — James Fiorillo
(74) *Attorney, Agent, or Firm* — Grasso PLLC

(57) ABSTRACT

Systems, devices, and process are provided for tailored interpersonal communication platform management. This can include tailoring interpersonal communication methodologies across a selection of network supported interpersonal communication platforms including one-on-one social media, broadcast social media, email, SMS, and VoIP, etc. for a user, and among and between the user and enrollees or participants in one or more of various ICPs.

15 Claims, 5 Drawing Sheets

(56) References Cited

U.S. PATENT DOCUMENTS

| | | | | |
|---|---|---|---|---|
| 2009/0192873 A1* | 7/2009 | Marble | G06Q 20/10 | 705/14.1 |
| 2010/0030889 A1* | 2/2010 | Fuchs | G06Q 10/10 | 709/224 |
| 2010/0257246 A1 | 10/2010 | Omidyar et al. | | |
| 2011/0047221 A1* | 2/2011 | Watanabe | G06Q 10/10 | 709/206 |
| 2011/0047246 A1* | 2/2011 | Frissora | G06F 9/543 | 709/219 |
| 2011/0066710 A1 | 3/2011 | Paul | | |
| 2011/0179126 A1* | 7/2011 | Wetherell | H04L 51/36 | 709/206 |
| 2011/0208814 A1* | 8/2011 | Bostrom | G06Q 10/10 | 709/204 |
| 2011/0238766 A1* | 9/2011 | Lew | H04L 29/12896 | 709/206 |
| 2011/0258049 A1* | 10/2011 | Ramer | G06F 17/30867 | 705/14.66 |
| 2011/0270923 A1* | 11/2011 | Jones | G06F 3/0421 | 709/204 |
| 2012/0066331 A1* | 3/2012 | Smith | H04M 3/4878 | 709/206 |
| 2012/0296974 A1* | 11/2012 | Tabe | G06Q 10/06 | 709/204 |
| 2013/0007150 A1* | 1/2013 | Hertz | H04L 51/32 | 709/206 |
| 2013/0054701 A1* | 2/2013 | Leeder | G06Q 50/01 | 709/205 |
| 2013/0054716 A1* | 2/2013 | Levinson | G06Q 10/10 | 709/206 |
| 2013/0073636 A1* | 3/2013 | Zhu | H04L 51/043 | 709/206 |
| 2013/0138746 A1* | 5/2013 | Tardelli | H04L 12/6418 | 709/206 |
| 2013/0144950 A1* | 6/2013 | Sanakaranarasimhan | G06Q 10/10 | 709/204 |
| 2013/0191475 A1* | 7/2013 | Partovi | H04L 51/14 | 709/206 |
| 2013/0290494 A1* | 10/2013 | Goudarzi | H04L 65/1046 | 709/219 |
| 2013/0339464 A1* | 12/2013 | Goudarzi | H04L 61/1547 | 709/206 |
| 2014/0059443 A1* | 2/2014 | Tabe | H04L 51/32 | 715/738 |
| 2014/0074925 A1* | 3/2014 | Budin | G06Q 10/10 | 709/204 |
| 2014/0074952 A1* | 3/2014 | White | G06Q 10/107 | 709/206 |
| 2014/0164504 A1* | 6/2014 | Dellenbach | H04L 67/306 | 709/204 |
| 2014/0188729 A1* | 7/2014 | Hong | H04L 41/0686 | 705/44 |
| 2014/0219132 A1* | 8/2014 | Delveaux | H04L 12/4035 | 370/254 |
| 2014/0237123 A1* | 8/2014 | Dave | H04W 52/0261 | 709/227 |
| 2014/0280651 A1* | 9/2014 | Krugman | H04L 51/14 | 709/206 |
| 2014/0379814 A1* | 12/2014 | Graff | H04M 1/72547 | 709/206 |
| 2015/0046553 A1* | 2/2015 | DeBenedictis | H04L 51/04 | 709/206 |
| 2015/0156159 A1* | 6/2015 | Hanson | H04L 51/18 | 709/204 |
| 2015/0163311 A1* | 6/2015 | Heath | G06Q 30/0201 | 709/204 |
| 2015/0212984 A1* | 7/2015 | Bowden | G06F 17/30867 | 715/234 |

OTHER PUBLICATIONS http://blog.seesmic.com, Feb. 2014.
Update Social Networks with Ping.fm, Feb. 2014.

* cited by examiner

| USER (410) | CONTACT (420) | CURRENT TYPE OF COMMUNICATIONS USED (430) | CONTACT TYPE (440) | CONTACTS SOCIAL NETWORK USAGE (450) | SUGGESTIONS ON HOW TO COMMUNICATE (460) |
|---|---|---|---|---|---|
| USER A | USER B (421) | EMAIL; LANDLINE PHONE; VOIP | PERSONAL | SOCIAL MEDIA A (PERSONAL); SOCIAL MEDIA B (FUN); SOCIAL MEDIA C (FORMAL); PROFESSIONAL MEDIA A (WORK) | SOCIAL MEDIA A; PERSONAL MEDIA A |
| | USER C (422) | EMAIL; CELLULAR PHONE; SMS MESSENGER | ACQUAINTANCE | SOCIAL MEDIA A (PERSONAL); SOCIAL MEDIA B (FUN); PROFESSIONAL MEDIA B (WORK) | SOCIAL MEDIA B; BLOG; PROFESSIONAL MEDIA B |
| | USER D (423) | EMAIL; LANDLINE PHONE; VIDEO MESSENGER, WIKI, IBM® COMMUNITIES | WORK | SOCIAL MEDIA A (FUN); SOCIAL MEDIA B (WORK); SOCIAL MEDIA C (PERSONAL); PROFESSIONAL MEDIA A (FUN) | SOCIAL MEDIA B |
| | USER E (424) | EMAIL, CELLULAR PHONE | CUSTOMER | WIKI (FUN); BLOG (CONSUMER); SOCIAL MEDIA B (PERSONAL; FORMAL); PROFESSIONAL MEDIA A (WORK) | SOCIAL MEDIA A; WIKI; BLOG |
| | USER F | EMAIL, CELLULAR PHONE, VOIP | RELATIVE | (NONE) | SOCIAL MEDIA A; WIKI; BLOG |
| | ~ | ~ | ~ | ~ | ~ |
| | USER N | ... | ... | ... | ... |
| | TOTAL USERS (427) | % EMAIL; % PHONE; % VOIP; ETC. | % PERSONAL CONTACTS; % PROFESSIONAL CONTACTS; ETC. | % SOCIAL MEDIA A; % SOCIAL MEDIA B; % PROFESSIONAL MEDIA A; % PROFESSIONAL MEDIA B; ETC. | % SOCIAL MEDIA A; % SOCIAL MEDIA B; % PROFESSIONAL MEDIA A; % PROFESSIONAL MEDIA B; ETC. |

TAILORED INTERPERSONAL COMMUNICATION PLATFORM (ICP) MANAGEMENT

BACKGROUND

The present invention relates to tailored interpersonal communication platform management and more specifically for devices, systems, and processes for tailoring interpersonal communications across a selection of network supported interpersonal communication platforms including one-on-one social media, broadcast social media, email, SMS, and VoIP, etc.

Interpersonal communication platforms continue to evolve and new ones emerge to replace or supplement what has come before. Interpersonal communication platforms (ICPs) include Plain Old Telephone Service (POTS), Voice over Internet Protocol (VoIP), social media (both personal (Facebook™) and professional (LinkedIn™)), blogs, broadcast services, SMS, MMS, email, wikis, etc. Some of these may be considered one-on-one social media (e.g., email and VoIP) and some may be considered broadcast social media (e.g., Twitter™) and some may be considered both (e.g., Facebook™). Winnowing down from the available choices to which one to use for a certain message or certain recipient can be a beneficial endeavor. Likewise, selecting which ones to use when seeking to reach one or more target audiences can also be a beneficial endeavor. Furthermore, managing updates across many ICPs can provide for efficiencies and be beneficial in reducing duplication and reducing the risk of posting on unsuitable ICPs.

BRIEF SUMMARY

Devices, systems, and processes for tailoring interpersonal communication methodologies across a selection of network supported interpersonal communication platforms including one-on-one social media, broadcast social media, email, SMS, and VoIP, etc. are provided. Embodiments may include a Tailored Communication Platform (TCP) System that provides users with tailored management of interpersonal communication platforms that a user has employed or may be suggested to employ in the future. This tailored management may include making suggestions on which ICP to employ for specific target recipients known to the user or unknown to the user. This tailored management may also include making suggestions on which ICPs to employ for certain messages and for certain message topics. The TCP may make suggestions using a TCP Manager that analyzes past communications of a user as well as available interpersonal platforms, known and potential recipients, and other tailored analytics.

For example, embodiments may provide suggestions of a specific ICP for a user when sending a specific message to targeted recipients, whether specifically identified or not, based on a user profile and interactions between the user and the targeted recipients. Similarly, embodiments may provide a determination as to which ICPs a user should join based on past communication to others and the ICPs the others belong to. Likewise, a message from a user may be routed to preferred ICPs based on the content of the message. Still other applications are possible too.

Embodiments may include analyzing communications to other users to understand a relationship between users; providing a list of ICPs to join and which are preferred to connect with a particular user or type of user; and routing messages to the other user's preferred network based on the topic and context if you communicate with a user through multiple networks. Thus, embodiments may analyze communications to others to understand a relationship of or between the user and these other participants or enrollees, provide a list of social networks to join for a user, and identify preferred networks to join in order to connect to a particular user to other participants or enrollees. Embodiments may also serve to route or identify how to route a message to a participant's preferred network based on the topic and context of a message when a user communicates with a targeted participant through multiple ICPs.

BRIEF DESCRIPTION OF THE SEVERAL VIEWS OF THE DRAWINGS

FIG. 4 shows a table as may be populated, updated, or otherwise used by a Tailored Communication Platform Manager in embodiments.

DETAILED DESCRIPTION

Figure 1:
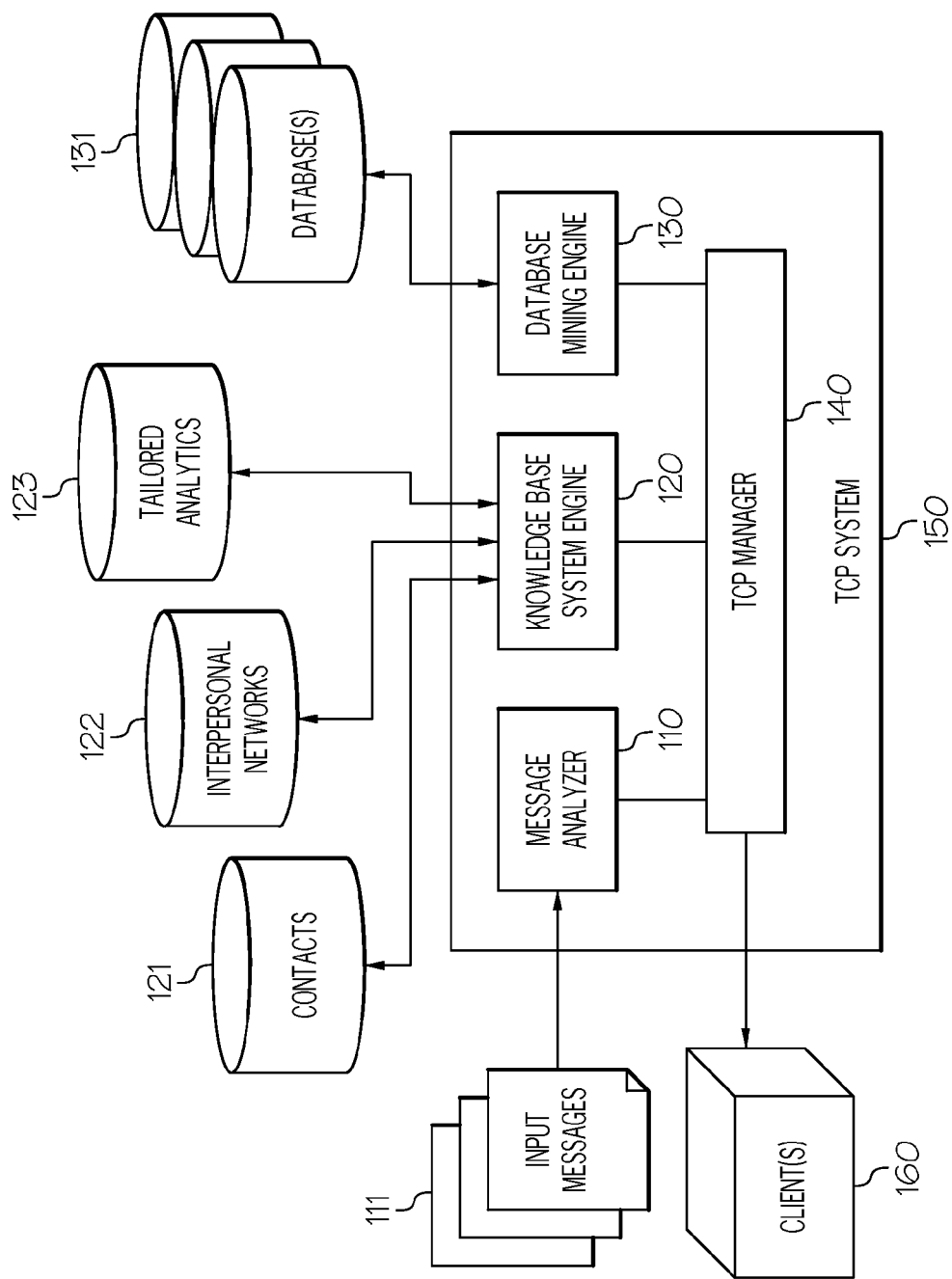
FIG. 1 shows a schematic of a Tailored Communication Platform (TCP) System and available resources as may be employed in embodiments.

Devices, systems, and processes for tailoring interpersonal communication methodologies are provided. Embodiments may involve analysis and selections across numerous network supported interpersonal communication platforms (ICPs) including one-on-one social media, broadcast social media, email, SMS, and VoIP, etc. These embodiments may include a Tailored Communication Platform (TCP) System that provides a user with tailored management of interpersonal communication platforms (ICPs) that the user employs or may be suggested to employ. The embodiments may also employ selection and use of certain ICPs based on message type, message content, recipient type, and other analytics as well.

Embodiments may provide a smart filter for which a subset of social networks (i.e., ICPs) a user may subscribe to may be identified from a selection of all available or all known ICPs. This smart filter may include identification of specific targeted recipients, enrollees, participants etc., who may be targeted for a message and or proposals of which ICP may be used to reach the targeted recipient or recipients. The smart filter or TCP manager may, thus, provide analysis and proposals of which ICPs to belong to and which ICPs are suited for certain interpersonal network communications of a particular user. Moreover, after joining the suggested ICPs and reaching out to suggested recipients participating in these ICPs the TCP System may determine and provide recommendations as to which subset of ICPs updates may be beneficial and may be updated using analytic data sources such as a user's identified topics of interest, the topics of interest of targeted recipients and the topics of interest of other contacts or connections, either direct or through others. Likewise, updates of connections and ICPs may also be carried out using these same analytic data sources. Thus, embodiments can provide for data mining techniques, and knowledge based systems to perform analysis, store data, and come up with suggestions.

Embodiments may include seeking prompts from users to gather information for storage, analysis, and subsequent mining. These may include prompts made to a user to "think about who needs to know who you are and what you do?"; to "identify where these folks regularly gather"; and whether you consider them work or personal contacts.

Further analytics for consideration to identify ICPs and target recipients may use or consider target user or recipient markets, target user or recipient products, and target user or recipient brands. Also, previous communications of a user may be mined for harvesting lists of recipients and subject matter of these previous communications with the user. These communications may include POTS messages, VoIP messages, MMS messages, SMS messages, emails, etc. From this information additional determinations such as to who a user is in touch with, the category the different contacts may be sorted into and the purpose of the communications may be determined and stored. In embodiments, depending on the type of communication a user makes with a recipient, the TCP manager may propose a list of ICPs to subscribe to. Suggested recipients may be determined by analyzing past communications of a user with this recipient as well as using analytics comprising textual analysis, voice analysis, keywords, common events, etc. These analytics may assist a TCP manager in determining if a known recipient is a friend, acquaintance, customer, work contact, etc.

In embodiments, searches of a user's ICP usage may be conducted to determine or identify the ICPs the user belongs too or otherwise uses. An analysis of the user's past posts, tweets, labels for their groups, type of contacts in their social graphs etc. may also be conducted for winnowing down suggestions of ICPs for the user. For example, information such as if a user has 90% of his or her existing recipients listed in Facebook™ may suggest that the user is mixing personal and work contacts together. However, a subsequent analysis of messages exchanged with the recipients in Facebook™ may change the analysis and indicate that these recipients are mostly personal contacts. Likewise, an analysis of a different ICP may yield a certain result on initial analysis but may yield different results when further analysis of the data is analyzed. Still further, in the absence of data, default settings may also be adopted by the TCP system and subsequently overridden when more data becomes available. For example, all recipients in Linkedin™ may be considered to be work contacts until such time as subsequent messages to a specific user or access to different ICPs is identified or creates a pattern strong enough to deviate from the default settings of a user.

FIG. 1 shows a schematic of a Tailored Communication Platform System in communication with various resources and clients as may be employed in embodiments. FIG. 1 shows a Tailored Communication Platform System 150 having a message analyzer 110, a knowledge base engine 120, a database mining engine 130, and a Tailored Communication Platform Manager 140 in communication with each. The TCP System 150 is also shown to be in communication with clients 160, Input Messages 111, contact storage 121, interpersonal networks storage 122, tailored analytics storage 123, and databases 131.

The Message Analyzer 110 may be configured to analyze messages that a user intends to send to her favorite contacts on different social networks. The Knowledge Base System 120 may be configured to query the user and also the databases and storage to build a Main Idea for an analytics map that may be used for suggestions to a user or other client. The Database Mining Engine 130 may use prior communication data like emails, phone records, and live-chat messages to determine favorite contacts.

Still further, in operation, the TCP System 150 may employ the TCP Manager 140 and the analyzer 110, engine 120 and the engine 130 to carryout analysis of the data available on in the storage 121-123 as well as the databases 131 and the messages 111 and provide suggestions and analysis to the clients 160. The storage 121-123 may be resident in the same storage medium and may be separated as well. The input messages 111 may include messages from various clients subscribing to or otherwise interested in receiving service from the TCP System 150. Likewise, the client storage 121 may retain contacts used by clients of the TCP System for subsequent analysis. The Interpersonal Networks Storage 122 may retain lists of available ICPs for subsequent suggestion by the TCP System 150 and the tailored analytics storage 123 may retain preferences and settings made by the clients 160 or an administrator. Other analytics may be stored and administered there as well.

Databases 131 may contain more general information that is mined by the mining engine 130 to identify trends and other useful information for making suggestions of ICPs and the like by the TCP System 150. The TCP Manager 140 may serve to control and coordinate communications and analysis by each of the engines 110, 120, and 130 as well as serve as a communication manager for input and output by the TCP System 150 to clients. Thus, the TCP System 150 may be considered to employ subsystems that assist with and are tasked with performing analysis, data storage, and determining suggestions and proposals.

Figure 2:
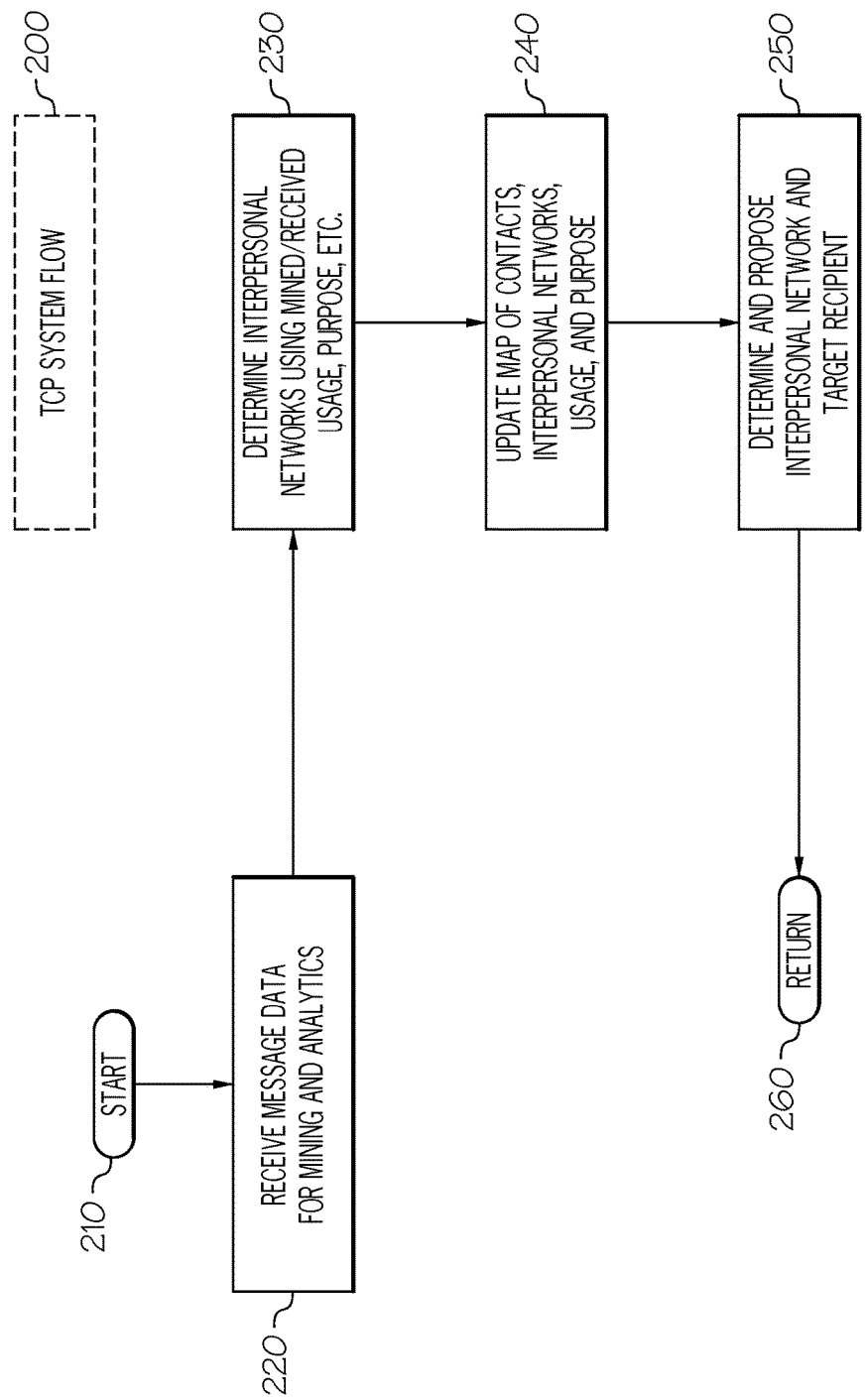
FIG. 2 shows a flowchart of Tailored Communication Platform flow as may be employed in embodiments.

FIG. 2 shows a flowchart explaining how subscriptions to ICPs may be formulated in embodiments. As can be seen in FIG. 2, at 220 message data may be received for subsequent mining and analytics. Then, at 230, from this data one or more ICPs may be specified using the mined data as well as parameters such as usage, purpose, timing, user preference, etc. At 240, a database map of contact recipients may be updated as well as other databases of other linked data including ICP names, usage amounts and histories, communication purposes, etc. Then, at 250, using the mined information including the message data and the user/participant preferences, a determination may be made of a recommended ICP and this ICP may be proposed to the user for purposes of making a pending communication as well as for setting preferences for future messages and other communications. Box 260 shows the process in embodiments may be cyclical or repetitive in nature.

Thus, in embodiments a list of favorite contacts may be obtained. Data mining techniques based on a participant's previous communication data like emails, phone records, and chat messages with his/her contacts may be conducted with respect to these contacts or other information or purposes. And, from this, preferential ICPS may be identified for certain contacts or certain topics or certain communication purposes.

The analysis in embodiments may also include making determinations of which ICPs specific contacts and participants belongs to and analyzing the contact's and participant's past posts, tweets, labels for their groups, and the related type of other contacts in their social networks. In embodiments the analysis may also include using a knowledge base system that queries the user using appropriate questions and builds up a database consisting of a map between contacts, social networks, and interests/usage purpose from the answers to the queries. A table may then be populated or updated using the answers to the queries.

Figure 3:
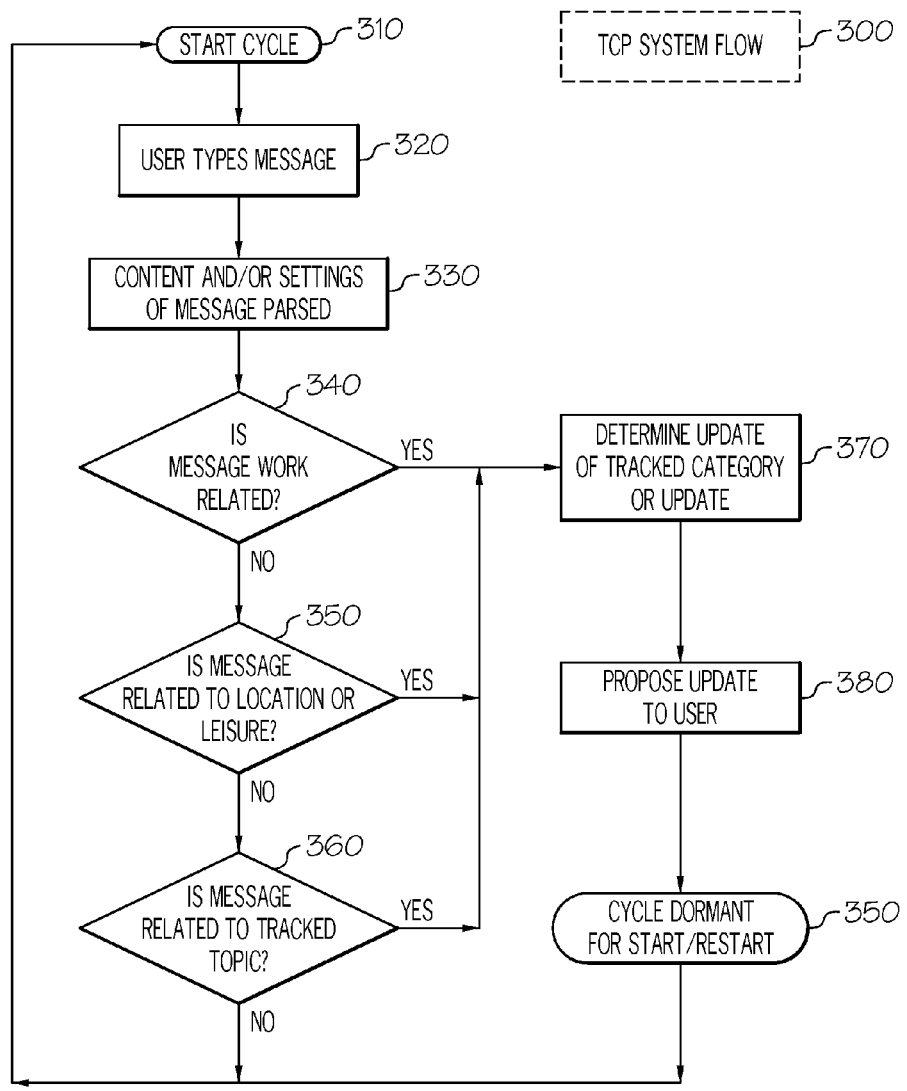
FIG. 3 shows a flowchart of Tailored Communication Platform flow as may be employed in embodiments.

FIG. 3 shows a flowchart providing how updates for users may be provided in embodiments. As is shown in FIG. 3, a user types in a message to communicate to social networks, a message analyzer data mining system may analyze the message to determine the interest/usage purpose type of the message. Once, this is done, the smart suggestion system may determine what social networks the user's favorite contacts use for the identified interest/usage purpose. This determination may be done using the map of FIG. 4 and appropriate updates may be made to those social networks. In so doing, a contact that a user is connected with via multiple ICP can only receive the post through the ICP that relates to the topic.

As can be seen in box 310 the cycle may start or continue from a previous cycle. A message may be entered by a user as shown at 320. The content of this message may then be parsed as shown at 330. If the message is related to work, for example, a determination at 370 may be made to update the tracked category. If the message is related to social activities, for example, a similar determination may be made at 370, but this time with regard to social contacts, activities, topics, etc. And, if the message is related to a tracked topic, then the appropriate update may itself be made, as shown at 370, this time, however, being related to the tracked topic as identified at 360. In each instance, a proper update may be posted as shown at 380. An update may be considered proper if it relates to the category sieve 340, 350, or 360 in which the message passed before reaching the determination of 370. Once the update is made the process may start again. In these processes and in other embodiments, statistical metrics about community activity, e.g., which articles are popular and the click activities of participants including users, enrollees, etc., may also be considered when identifying recipients of messages and ICPs.

Still further, embodiments may use statistical metrics to assist in determinations for identifying the type and identity of topics at use within a community or ICP and further enhance these statistics to identify and determine what type of topics a user of the ICP uses that particular ICP for. Thus, statistical information may be used to assist with matching repeated communication patterns and topics utilizing email/IM/phone etc with a recipient in an ICP and which ICP a user should use to communicate with that recipient. In other words, analyzing communications to others may be used to: understand a relationship of the others; provide a list of social networks to join; identify which ICP to use to connect to a particular recipient based on a relationship; and for routing a message to the other user's preferred ICP based on a topic and context if a user communicate with a recipient through multiple ICPs.

FIG. 4 provides a table or database 400 as may be employed in embodiments. The type of information retained may include user/participant name 410, contact recipients/participants 420, type of communication used 430, contact/recipient type 440, contact/participant ICP usage 450, and TCP System suggestions 460. As can be seen there can be many contacts/recipients/participants 420-427 associated with a single user 410 and each contact/recipient may have unique histories based on previous interactions of the contact. These can include the types of ICPs used to communicate with the user, the category that the contact/recipient is a member of, the ICPs the contact/recipient has used or is registered to use; and the proposed modifications from the TCP system.

More specifically, the table 400 shows a User A with friends/email contacts/work acquaintances/customers etc. identified as User B, User C, User D, User E, and User F. The types of communication or combinations of communication types that exist between User A and another User are shown in column 430. Whether they are a friend, acquaintance, work friend, customer etc. is reflected in column 440 and ICPs those users belong to and analysis results of how those users are using those sites are shown in 450. For example, a user may belong to 3 different ICPs, but one ICP may be used for more personal messages (i.e., postings and updates and messages), one ICP may be used for more business, and one ICP may be used for favorite activities. This may be reflected in 450 or 460 or both. Finally, in column 460 suggestions as to what social site(s) User A should use to communicate with the other User may be provided. For example, if a user was determined to be a friend to User A the system would suggest that User A communicates with that user through Facebook™ and Pinetrest™ even though that user may belong to 4 total ICPs. Thus, in embodiments, the TCP system can, therefore, offer up not only the social networking site a user belongs too, but have the intelligence of what site to communicate with whom.

An analysis using the type of communication, the topics discussed, the shared events etc. and possible sites that state their relationship with User A are underpinning the results in column 460. The last row 470 can show statistics for the contacts/recipients as % of a user's contacts that belong to each site. These percentages may then be considered to filter out desired percentages, for example, just friend contacts that belong to this site etc. Likewise, a user can filter results to identify two social network sites, one that is the top ICP work website and one that is the personal ICP website.

In embodiments, the analysis can be dynamically updated if the participant in that group communicates with a user differently or, maybe, if a user's communication through social tools and email etc. changes from a work relationship to a friend relationship, the TCP can suggest to a user to friend the participant in a ICP or suggest a different label for them within the existing ICP. When a user joins an ICP if a user is already on the ICP and establishes a connection with a second user the type of communication between the two may be based on the analysis for that network is recorded. For example in Facebook™ when a user connects with that contact the user will automatically have Work people tagged with Work, and Family tagged with Family. This is useful for example if User A uses Google+™ as a personal type of communication, but User D uses it for work—if User A connects with User D through Google+™, this type of communication is recorded so that if User A does a personal post it will not be sent to User D because of the type of communication relationship that was set. This sorting and identification may assist with sorting and managing subsets of all the ICPs a user has subscribed to, to intelligently get updated for each connection based on the current topic of interest. For example, if User A connects to a User B in 3 or 4 different sites, when User A goes to post a message it will help User A deliver it to the correct account of User B based on the topic or type of post.

In embodiments, ICPs may be federated so that if a user posts on one ICP the TCP can determine which site and contact is appropriate. For example if User A connects with a work person User 1 through both Facebook™ and LinkedIn™ and he has his accounts federated, when User A goes to message User 1 if the message is work related through textual analysis then even if User A is on Facebook™ messaging them, instead of the message going to their Facebook™ account it would go to their LinkedIn™ instead since it was a work person with a work type of topic.

Figure 5:
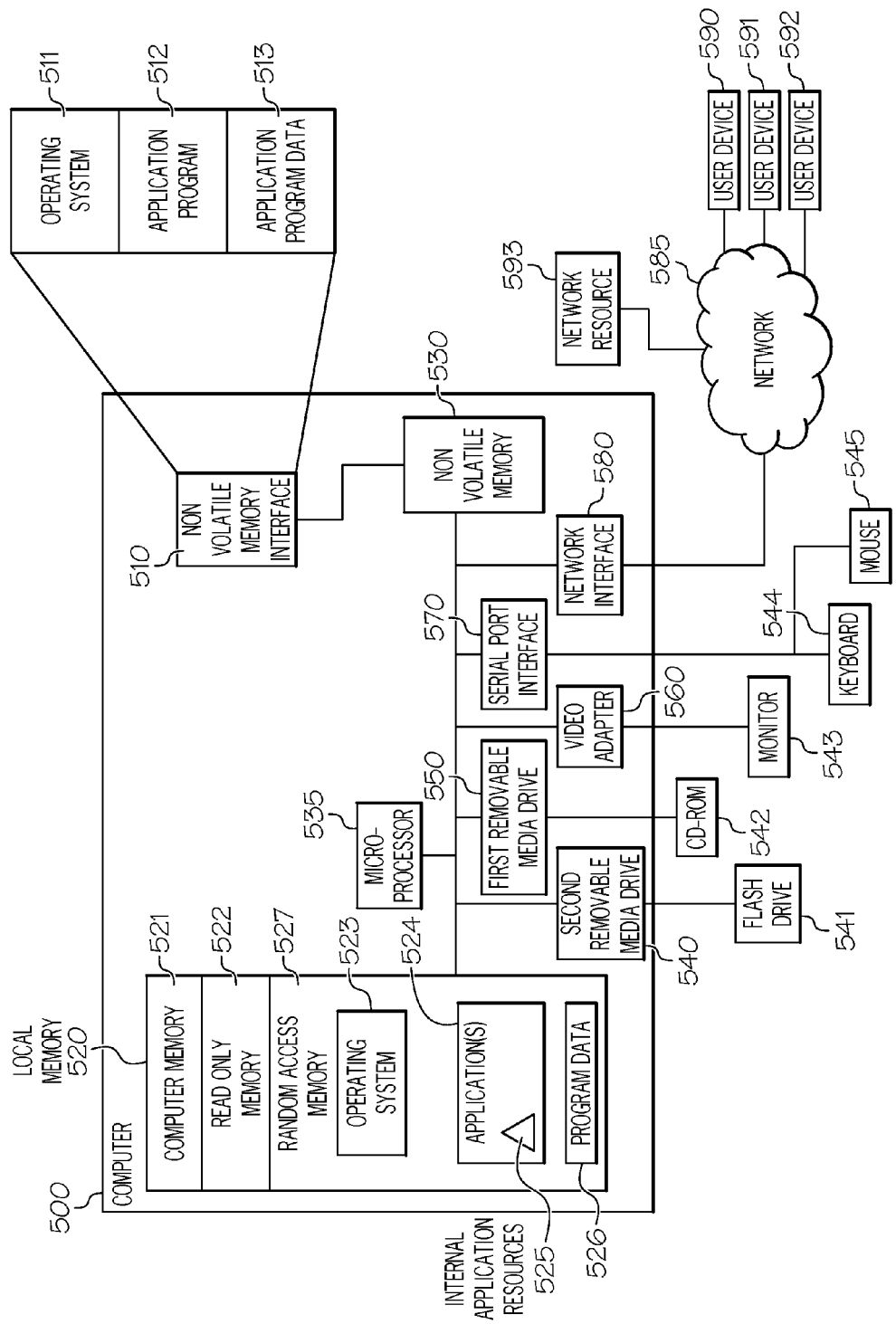
FIG. 5 shows a computer with a microprocessor in communication with a network, network resources, and user devices as may be employed in embodiments.

FIG. 5 shows a computer, network, user devices, and network resources as may be employed in embodiments. The computer 500 is shown with a hard drive interface 510, a hard drive 530, a serial port interface 570, a network interface 580, a video adapter 560, a first removable media drive 550, a second removable media drive 540, a processor unit 535, local memory 520 and a bus providing for communication among and between these computer components. The hard drive interface is shown having stored thereon an operating system 511, one or more application program modules 512, and application program data 513. The local memory 520 is shown with system memory 521, Read Only Memory 522, Random Access Memory 527, one or more instances of an operating system 523, one or more applications 524, internal resources for the applications 525, and program data 526. The computer 500 is shown connected to a monitor 543, a keyboard 544, a mouse 545 and network 585. Other input devices, which are not illustrated, may include a microphone, joystick, game pad, satellite dish, scanner, or the like. Flash drive 541 and CD-ROM 542 are shown for connection with removable media drives 540 and 550. The network 585 has network resource 593 and three user devices 590, 591, and 592 in communication with and through the network. The TCP and users described throughout may each be represented in the network and the various components represented in FIG. 5.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

What is claimed is:

1. A computer program product for interpersonal communication platform management, the computer program product comprising a non-transitory computer readable storage medium having program instructions embodied therewith, the program instructions readable by a microprocessor to cause a microprocessor or a group of microprocessors to perform a method comprising:
    operating a tailored communication platform (TCP) system, the TCP system comprising at least one or more of a: TCP manager instance, or a message analyzer instance, or a knowledge base system engine instance, or a database mining engine instance,
    the TCP system operated to consider a record of interpersonal communication platforms (ICPs) previously used by a first user, the interpersonal communication platforms accessible by multiple participants via at least one website over the Internet, where the participants enroll in at least one interpersonal communication platform and provide unique identifying information about themselves, the unique identifying information including a username;
    considering, by the TCP system, a record of communications previously sent by the user to participants enrolled in one or more ICPs;
    in response to considering the record of communications, identifying, by the TCP system, a plurality of patterns, the plurality of patterns including, previous ICPs used by the user to send messages to one or more participants, and, ICPs not used by the user to send messages to at least one participant, the relationship between the user and each enrolled participant, a preferred ICP to reach each enrolled participant, and a cumulative analysis of ICPs used by the user to message each enrolled participant; and
    determining, by the TCP system, a suggestion, the suggestion to be provided to the user based on the plurality of patterns, the suggestion identifying to the user and linking a specific ICP as a preferred method for the user to message the specific participant in future messages, the specific ICP selected from at least two ICPs previously associated with the specific participant by the user,
    wherein the TCP system builds an analytics map based upon the record of ICPs previously used by the user and the record of communications previously sent by the user to participants enrolled in the one or more ICPs, and the identified plurality of patterns, the analytics map comprising a plurality of determined suggestions to be provided to the user.

2. The computer program product for interpersonal communication platform management of claim 1 wherein the program instructions embodied therewith further cause a microprocessor to:
    receive a message from the user;
    identify a topic of the received message;
    using the identified topic of the message to designate an ICP for the message to be sent on behalf of the user.

3. The computer program product for interpersonal communication platform management of claim 2 wherein the user was not previously enrolled in the designated ICP.

4. The computer program product for interpersonal communication platform management of claim 2 wherein the user was previously enrolled in the designated ICP.

5. The computer program product for interpersonal communication platform management of claim 1 wherein the program instructions embodied therewith further cause a microprocessor to:
    identify, for the user, a specific participant enrolled in an ICP that has not received a specific communication from the user in the past.

6. The computer program product for interpersonal communication platform management of claim 1 wherein the program instructions embodied therewith further cause a microprocessor to:
    identify, for the user, a specific ICP to be used by the user when sending a message previously categorized as relating to a specific topic.

7. The computer program product for interpersonal communication platform management of claim 1 wherein the program instructions embodied therewith further cause a microprocessor to:
   identify, after considering the communications previously sent by the user, an ICP for the user to enroll in, the identified ICP not presently indicated to be enrolled in by the user.

8. A system for interpersonal communication platform management, the system comprising:
   a microprocessor configured to operate as a database mining engine to consider a record of interpersonal communication platforms (ICPs) previously used by a first user, the interpersonal communication platforms accessible by multiple participants via at least one website over the Internet, where the participants enroll in the interpersonal communication platform and provide unique identifying information about themselves, the unique identifying information including a username;
   the database mining engine also configured to consider a record of communications previously sent by the user to participants enrolled in one or more ICPs;
   the microprocessor or another microprocessor configured to operate as a knowledge base system to identify a plurality of patterns in response to considering the record of communications, the plurality of patterns including previous ICPs used by the user to send messages to one or more participants and ICPs not used by the user to send messages to at least one participant, the relationship between the user and each enrolled participant, a preferred ICP to reach each enrolled participant, and a cumulative analysis of ICPs used by the user to message each enrolled participant; and
   the microprocessor or another microprocessor configured to operate as a tailored communication platform (TCP) manager to determine a suggestion to be provided to the user based on the plurality of patterns, the suggestion identifying to the user and linking a specific ICP as a preferred method for the user to message the specific participant with future messages unrelated to a pending message, the specific participant already present in the record of communications using at least two ICPs to previously communicate with the user,
   wherein the TCP manager is configured to build an analytics map based upon the record of ICPs previously used by the user and the record of communications previously sent by the user to participants enrolled in the one or more ICPs, and the identified plurality of patterns, the analytics map comprising a plurality of determined suggestions to be provided to the user.

9. The system of claim 8 further comprising a message analyzer to:
   receive a message from the user;
   identify a topic of the received message;
   using the identified topic of the message to designate an ICP for the message to be sent on behalf of the user.

10. The system of claim 9 wherein the user was not previously enrolled in the designated ICP.

11. The system of claim 9 wherein the user was previously enrolled in the designated ICP.

12. The system of claim 8 wherein the TCP manager is configured to:
   identify, for the user, a specific participant enrolled in an ICP that has not received a specific communication from the user in the past.

13. The system of claim 8 wherein the TCP manager is configured to:
   identify, for the user, a specific ICP to be used by the user when sending a message previously categorized as relating to a specific topic.

14. The system of claim 8 wherein the TCP manager is configured to:
   identify, after considering the communications previously sent by the user, an ICP for the user to enroll in, the identified ICP not presently indicated to be enrolled in by the user.

15. The system for interpersonal communication platform management of claim 8 wherein operating as a tailored communication platform (TCP) system comprises creating instances of at least one or more of a: TCP manager instance, or a message analyzer instance, or a knowledge base system engine instance, or a database mining engine instance.

* * * * *